United States Patent
Tsai et al.

(10) Patent No.: US 10,469,600 B2
(45) Date of Patent: Nov. 5, 2019

(54) LOCAL PROXY FOR SERVICE DISCOVERY

(71) Applicant: Dell Products, L.P., Round Rock, TX (US)

(72) Inventors: Chen-Hsi Tsai, Taipei (TW); Yu-Ching Wang, Taipei (TW); Tzu-Hui Sung, Taipei (TW); Rezwanul Kabir, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 170 days.

(21) Appl. No.: 15/811,786

(22) Filed: Nov. 14, 2017

(65) Prior Publication Data

US 2019/0149618 A1    May 16, 2019

(51) Int. Cl.
*H04L 29/08* (2006.01)
*H04L 12/24* (2006.01)
*H04L 12/66* (2006.01)

(52) U.S. Cl.
CPC .............. *H04L 67/16* (2013.01); *H04L 12/66* (2013.01); *H04L 41/046* (2013.01); *H04L 67/12* (2013.01); *H04L 67/146* (2013.01); *H04L 67/28* (2013.01)

(58) Field of Classification Search
CPC ....... H04W 4/70; H04W 84/18; H04W 24/02; H04W 4/50; H04W 88/16; H04W 12/06; H04W 12/08; H04W 16/22; H04W 24/00; H04W 48/12; H04W 4/18; H04W 60/04; H04W 72/087; H04W 8/005; H04W 40/246; H04W 4/00; H04W 4/08; H04W 4/60; H04W 60/00; H04W 88/04; H04W 8/08; H04W 92/18; H04L 41/08; H04L 41/12; H04L 67/12; H04L 12/283; H04L 12/66; H04L 2012/2841; H04L 63/101; H04L 67/125; H04L 67/28; H04L 67/36; H04L 41/0233; H04L 41/0266; H04L 41/0273; H04L 41/028; H04L 41/0813; H04L 41/0853; H04L 41/142; H04L 41/22; H04L 43/00; H04L 43/026; H04L 43/04; H04L 67/02; H04L 67/16; H04L 67/322; H04L 69/08; H04L 69/18; H04L 61/1511; H04L 67/04; H04L 29/02; H04L 29/08; H04L 41/0246; H04L 41/0806;
(Continued)

(56) References Cited

U.S. PATENT DOCUMENTS 6,286,047 B1 * 9/2001 Ramanathan ..... H04L 29/12066
370/229
6,336,138 B1 * 1/2002 Caswell ................. H04L 41/12
345/440
(Continued)

*Primary Examiner* — Greg C Bengzon
(74) *Attorney, Agent, or Firm* — Fogarty LLP

(57) ABSTRACT

Systems and methods for a local proxy for service discovery. In some embodiments, an Internet-of-Things (IoT) gateway may include: a processor; and a memory coupled to the processor, the memory including program instructions stored thereon that, upon execution by the processor, cause the IoT gateway to: retrieve, by a service discovery agent, endpoint information maintained by a service discovery server remotely located with respect to the IoT gateway; store the service endpoint information in the memory; receive a service request aimed at a service endpoint; and provide the service endpoint information, from the memory, in response to the service request.

14 Claims, 7 Drawing Sheets

(58) Field of Classification Search
CPC ..... H04L 41/50; H04L 43/10; H04L 61/1541; H04L 61/2015; H04L 61/3025; H04L 61/303; H04L 61/305; H04L 61/306; H04L 61/6004; H04L 63/02; H04L 63/062; H04L 63/08; H04L 63/0815; H04L 63/0823; H04L 63/10; H04L 63/123; H04L 63/166; H04L 63/20; H04L 67/104; H04L 67/1046; H04L 67/1093; H04L 67/2823; H04L 67/2842; H04L 67/2861; H04L 67/303; H04L 67/325; H04L 69/329; H04L 9/3247; H04L 9/3263; H04L 9/3268; G06F 3/048; G06F 8/60; G06F 9/4451; G06F 9/448

See application file for complete search history.

(56) References Cited

U.S. PATENT DOCUMENTS

| | | | | |
|---|---|---|---|---|
| 8,065,411 | B2* | 11/2011 | Spiess | H04L 43/00 707/944 |
| 8,402,525 | B1* | 3/2013 | Shah | H04L 41/0273 726/28 |
| 9,037,571 | B1* | 5/2015 | Baranowski | H04L 41/12 707/716 |
| 9,154,479 | B1* | 10/2015 | Sethi | H04L 63/08 |
| 9,426,030 | B1* | 8/2016 | Anerousis | H04L 41/0859 |
| 9,893,995 | B1* | 2/2018 | Sharma | H04L 49/25 |
| 10,003,495 | B1* | 6/2018 | Sharma | H04L 67/34 |
| 10,135,755 | B1* | 11/2018 | Lincourt, Jr. | H04L 47/803 |
| 10,181,978 | B1* | 1/2019 | Argenti | H04L 67/12 |
| 10,181,985 | B1* | 1/2019 | Passaglia | H04L 67/1061 |
| 10,187,255 | B2* | 1/2019 | Mukherjee | H04L 41/0813 |
| 10,310,832 | B2* | 6/2019 | Hussein | G06F 8/61 |
| 2004/0162871 | A1* | 8/2004 | Pabla | H04W 8/005 709/201 |
| 2005/0033808 | A1* | 2/2005 | Cheng | H04L 67/306 709/205 |
| 2005/0182825 | A1* | 8/2005 | Eytchison | H04L 67/16 709/217 |
| 2005/0267952 | A1* | 12/2005 | Ricciardi | H04L 67/16 709/220 |
| 2006/0239190 | A1* | 10/2006 | Kumar | H04L 12/2809 370/230 |
| 2006/0248121 | A1* | 11/2006 | Cacenco | G06F 8/71 |
| 2007/0112574 | A1* | 5/2007 | Greene | G06F 9/5072 340/572.1 |
| 2009/0158302 | A1* | 6/2009 | Nicodemus | G06F 21/577 719/328 |
| 2009/0158407 | A1* | 6/2009 | Nicodemus | H04L 63/20 726/6 |
| 2009/0222842 | A1* | 9/2009 | Narayanan | G06F 9/542 719/328 |
| 2009/0249440 | A1* | 10/2009 | Platt | H04L 63/0815 726/1 |
| 2010/0017368 | A1* | 1/2010 | Mao | G06F 9/465 707/E17.014 |
| 2010/0043050 | A1* | 2/2010 | Nadalin | H04L 63/102 726/1 |
| 2010/0198938 | A1* | 8/2010 | Molland | H04L 29/08846 709/217 |
| 2011/0022641 | A1* | 1/2011 | Werth | H04L 67/34 707/803 |
| 2011/0158088 | A1* | 6/2011 | Lofstrand | G06F 9/465 370/229 |
| 2012/0036252 | A1* | 2/2012 | Shi | H04L 67/16 709/224 |
| 2012/0042040 | A1* | 2/2012 | Bailey | G06F 9/5055 709/217 |
| 2012/0051365 | A1* | 3/2012 | Bahr | H04W 48/12 370/401 |
| 2012/0246297 | A1* | 9/2012 | Shanker | H04L 67/2842 709/224 |
| 2013/0013793 | A1* | 1/2013 | Sanchez Herrero | H04W 4/70 709/227 |
| 2013/0016657 | A1* | 1/2013 | Muhanna | H04W 4/70 370/328 |
| 2013/0117679 | A1* | 5/2013 | Polis | H04L 67/00 715/738 |
| 2013/0176940 | A1* | 7/2013 | Hohammed | H04W 24/00 370/328 |
| 2013/0227036 | A1* | 8/2013 | Kang | H04L 65/40 709/206 |
| 2013/0246560 | A1* | 9/2013 | Feng | H04L 29/0809 709/217 |
| 2013/0254328 | A1* | 9/2013 | Inoue | H04L 29/08 709/217 |
| 2013/0294285 | A1* | 11/2013 | Zhang | H04W 24/02 370/254 |
| 2013/0304849 | A1* | 11/2013 | Mehta | H04L 63/02 709/217 |
| 2013/0332511 | A1* | 12/2013 | Hala | H04L 67/34 709/203 |
| 2013/0332627 | A1* | 12/2013 | Skog | H04W 4/70 709/244 |
| 2014/0105009 | A1* | 4/2014 | Vos | H04W 4/70 370/230 |
| 2014/0112189 | A1* | 4/2014 | Abraham | H04L 67/16 370/254 |
| 2014/0126581 | A1* | 5/2014 | Wang | H04W 4/70 370/431 |
| 2014/0143390 | A1* | 5/2014 | Umapathy | H04L 41/0813 709/221 |
| 2014/0204803 | A1* | 7/2014 | Nguyen | H04L 41/5054 370/255 |
| 2014/0206349 | A1* | 7/2014 | Bertrand | H04W 4/60 455/434 |
| 2014/0244834 | A1* | 8/2014 | Guedalia | H04L 67/16 709/224 |
| 2014/0289366 | A1* | 9/2014 | Choi | G06F 9/4451 709/218 |
| 2015/0006719 | A1* | 1/2015 | Gupta | H04L 67/16 709/224 |
| 2015/0023219 | A1* | 1/2015 | Jin | H04L 12/1403 370/259 |
| 2015/0033312 | A1* | 1/2015 | Seed | H04W 4/70 726/7 |
| 2015/0055640 | A1* | 2/2015 | Wang | H04W 60/00 370/338 |
| 2015/0074144 | A1* | 3/2015 | Zhang | H04W 4/70 707/770 |
| 2015/0074195 | A1* | 3/2015 | Mani | H04L 67/104 709/204 |
| 2015/0156266 | A1* | 6/2015 | Gupta | H04W 4/70 709/224 |
| 2015/0189459 | A1* | 7/2015 | Aon | H04W 4/70 455/558 |
| 2015/0201035 | A1* | 7/2015 | Profit | H04L 67/2842 709/213 |
| 2015/0230167 | A1* | 8/2015 | Choi | H04W 4/70 455/411 |
| 2015/0249672 | A1* | 9/2015 | Burns | H04L 12/66 726/4 |
| 2015/0264512 | A1* | 9/2015 | Jain | H04W 4/70 370/328 |
| 2015/0280983 | A1* | 10/2015 | Staykoff | H04W 4/14 709/226 |
| 2015/0282121 | A1* | 10/2015 | Kang | H04W 72/00 455/450 |
| 2015/0295766 | A1* | 10/2015 | Dickey | H04L 41/0856 709/221 |
| 2015/0319043 | A1* | 11/2015 | Dibirdi | H04L 41/0806 370/254 |
| 2015/0341446 | A1* | 11/2015 | Nguyen | H04L 67/16 709/223 |
| 2015/0347114 | A1* | 12/2015 | Yoon | G06F 8/61 235/375 |
| 2015/0347542 | A1* | 12/2015 | Sullivan | G06F 16/254 707/602 |

(56) References Cited

U.S. PATENT DOCUMENTS

| | | | |
|---|---|---|---|
| 2015/0350092 A1* | 12/2015 | Kwon | H04L 47/22 709/223 |
| 2015/0358874 A1* | 12/2015 | Ahn | H04L 12/66 370/331 |
| 2015/0373124 A1* | 12/2015 | Bhalla | H04W 4/70 709/202 |
| 2015/0381776 A1* | 12/2015 | Seed | H04W 4/70 709/203 |
| 2016/0007137 A1* | 1/2016 | Ahn | H04W 4/70 370/254 |
| 2016/0019294 A1* | 1/2016 | Dong | H04W 4/70 707/794 |
| 2016/0065556 A1* | 3/2016 | Sasin | H04W 12/06 |
| 2016/0065627 A1* | 3/2016 | Pearl | G06F 16/14 709/204 |
| 2016/0105371 A1* | 4/2016 | Choi | H04L 47/70 370/230 |
| 2016/0119434 A1* | 4/2016 | Dong | H04W 4/70 709/220 |
| 2016/0135241 A1* | 5/2016 | Gujral | H04W 4/70 370/328 |
| 2016/0226828 A1* | 8/2016 | Bone | H04W 4/70 |
| 2016/0234689 A1* | 8/2016 | Stan | H04L 67/12 |
| 2016/0247164 A1* | 8/2016 | Salajegheh | G06Q 30/016 |
| 2016/0247238 A1* | 8/2016 | Kunapuli | G06Q 40/12 |
| 2016/0248746 A1* | 8/2016 | James | H04W 4/70 |
| 2016/0277374 A1* | 9/2016 | Reid | H04L 63/061 |
| 2016/0285979 A1* | 9/2016 | Wang | H04L 67/16 |
| 2016/0291826 A1* | 10/2016 | Verzano | H04L 41/145 |
| 2016/0294605 A1* | 10/2016 | Searle | H04L 41/082 |
| 2016/0294614 A1* | 10/2016 | Searle | G06F 8/654 |
| 2016/0308721 A1* | 10/2016 | Dellisanti | H04L 41/0846 |
| 2016/0337181 A1* | 11/2016 | Cathrow | H04L 41/0806 |
| 2016/0337456 A1* | 11/2016 | Pathak | H04L 67/16 |
| 2017/0006135 A1* | 1/2017 | Siebel | H04L 67/02 |
| 2017/0006141 A1* | 1/2017 | Bhadra | H04L 67/12 |
| 2017/0006455 A1* | 1/2017 | Cho | H04W 4/70 |
| 2017/0019749 A1* | 1/2017 | Koshimizu | H04W 4/70 |
| 2017/0026488 A1* | 1/2017 | Hao | H04L 67/32 |
| 2017/0034016 A1* | 2/2017 | Carroll | H04L 41/0813 |
| 2017/0046366 A1* | 2/2017 | Rahman | H04W 4/70 |
| 2017/0048308 A1* | 2/2017 | Qaisar | H04L 67/1002 |
| 2017/0060574 A1* | 3/2017 | Malladi | G06F 8/70 |
| 2017/0063566 A1* | 3/2017 | Seminario | H04L 12/2816 |
| 2017/0093868 A1* | 3/2017 | Slavov | H04W 4/70 |
| 2017/0093915 A1* | 3/2017 | Ellis | H04L 63/20 |
| 2017/0099176 A1* | 4/2017 | Jain | H04L 41/046 |
| 2017/0099353 A1* | 4/2017 | Arora | H04L 67/12 |
| 2017/0105131 A1* | 4/2017 | Song | H04W 4/70 |
| 2017/0126809 A1* | 5/2017 | Chen | H04L 67/125 |
| 2017/0127370 A1* | 5/2017 | Wang | H04W 4/70 |
| 2017/0168777 A1* | 6/2017 | Britt | G06F 8/20 |
| 2017/0187642 A1* | 6/2017 | Nolan | H04W 4/70 |
| 2017/0196028 A1* | 7/2017 | Iwai | H04W 24/02 |
| 2017/0208139 A1* | 7/2017 | Li | H04W 4/70 |
| 2017/0223479 A1* | 8/2017 | Ly | H04W 4/70 |
| 2017/0242674 A1* | 8/2017 | Hussein | G06F 8/61 |
| 2017/0244600 A1* | 8/2017 | Hussein | H04L 41/0806 |
| 2017/0251329 A1* | 8/2017 | Bhalla | H04W 4/70 |
| 2017/0272894 A1* | 9/2017 | Wang | H04W 4/70 |
| 2017/0279803 A1* | 9/2017 | Desai | H04L 63/0884 |
| 2017/0295057 A1* | 10/2017 | Dost | H04W 4/70 |
| 2017/0295236 A1* | 10/2017 | Kulkarni | H04L 67/1097 |
| 2017/0310767 A1* | 10/2017 | Flynn, IV | H04W 4/70 |
| 2017/0311303 A1* | 10/2017 | Ahn | H04W 72/0406 |
| 2017/0317882 A1* | 11/2017 | Bitincka | H04L 67/06 |
| 2017/0329588 A1* | 11/2017 | Lundberg | G06F 8/60 |
| 2017/0337242 A1* | 11/2017 | Hu | H04L 29/08 |
| 2017/0351504 A1* | 12/2017 | Riedl | H04L 63/0428 |
| 2017/0359237 A1* | 12/2017 | Hao | H04L 67/02 |
| 2017/0359424 A1* | 12/2017 | Holdsworth | H04L 67/16 |
| 2018/0020057 A1* | 1/2018 | Koo | H04L 67/125 |
| 2018/0027080 A1* | 1/2018 | Yang | H04L 41/12 709/224 |
| 2018/0032327 A1* | 2/2018 | Adami | H04W 4/70 |
| 2018/0034655 A1* | 2/2018 | Christopher | H04L 12/283 |
| 2018/0034914 A1* | 2/2018 | Christopher | H04L 69/08 |
| 2018/0039494 A1* | 2/2018 | Lander | G06F 11/3688 |
| 2018/0041515 A1* | 2/2018 | Gupta | H04L 63/102 |
| 2018/0041856 A1* | 2/2018 | Lou | H04W 4/70 |
| 2018/0054490 A1* | 2/2018 | Wadhwa | G06F 9/45558 |
| 2018/0084064 A1* | 3/2018 | Starsinic | H04W 4/70 |
| 2018/0091506 A1* | 3/2018 | Chow | H04L 67/2838 |
| 2018/0092133 A1* | 3/2018 | Starsinic | H04W 4/08 |
| 2018/0103337 A1* | 4/2018 | Di Girolamo | H04W 4/70 |
| 2018/0109395 A1* | 4/2018 | Berdy | H04W 4/50 |
| 2018/0109650 A1* | 4/2018 | Berdy | H04L 41/0806 |
| 2018/0115467 A1* | 4/2018 | Li | H04L 67/12 |
| 2018/0115614 A1* | 4/2018 | Asena | H04L 67/16 |
| 2018/0152534 A1* | 5/2018 | Kristiansson | H04L 67/16 |
| 2018/0167785 A1* | 6/2018 | Wang | H04W 4/06 |
| 2018/0183882 A1* | 6/2018 | Flynn | H04W 4/70 |
| 2018/0288590 A1* | 10/2018 | Bhalla | H04W 4/70 |
| 2018/0359322 A1* | 12/2018 | Dong | H04L 45/306 |
| 2018/0375720 A1* | 12/2018 | Yang | H04L 29/08 |
| 2019/0028545 A1* | 1/2019 | Yang | H04W 4/00 |
| 2019/0028866 A1* | 1/2019 | Baek | H04W 4/50 |
| 2019/0138318 A1* | 5/2019 | Yang | H04L 41/0806 |

\* cited by examiner

LOCAL PROXY FOR SERVICE DISCOVERY

FIELD

The present disclosure generally relates to Information Handling Systems (IHSs), and, more particularly, to a local proxy for service discovery.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A new revolution is gaining momentum—a surge of innovation that involves vast ecosystems of sensors, devices, and equipment to networks that can transmit and receive data. With an estimated number of connected "things" reaching over 25 billion by 2020, the "Internet-of-Things" (IoT) is widely regarded as the next technological frontier.

Existing IoT deployments range from single device implementations to massive cross-platform systems that include tens, hundreds, or even thousands of heterogeneous devices. Tying it all together are different communication protocols that enable these various components to talk to each other.

Because IoT is still in its infancy, however, its underlying technologies remain fractured. Alliances and coalitions are being formed in hopes of someday unifying the IoT landscape. But, at the present time, there is still no central IoT standard or deployment oversight. Consumers and providers continue to face ever-increasing deployment, architecture, analytics, and security challenges.

For example, when building services in a distributed environment such as IoT, automated service discovery becomes important. Without service discovery, users or developers must manually reconfigure each service with endpoint information (e.g., URLs) for its depending services every time that information is changed.

Conventional "service discovery" services work as follows: first, a service provider registers itself onto a Service Discovery Server (e.g., Apache ZooKeeper™, HashiCorp's Consul, Netflix Open Source Platform's Eureka, Airbnb's SmartStack, etc.). The service provider may also offer endpoint information (URL), service type, service ID, etc. This information is kept on the service discovery server. Once a client needs such a service, it queries the Service Discovery Server, and retrieves the service provider's endpoint. Finally, the client can invoke the service provider based on what it just retrieved.

In an IoT and micro service architecture, an IoT Gateway queries for service endpoints of external cloud services or enterprise services on premise that it needs, and then invokes the targeted services according to the endpoint information (e.g., URL). (High-end IoT devices can have the same requirement.) These service discovery services maintain dynamic service lists and provide them to whichever node may need them, thus reducing the effort of keeping the up-to-date endpoint information of services locally.

As the inventors hereof have recognized, however, if service endpoint information is retrieved dynamically, it consumes resources and time as the requests and responses are sent back and forth between the IoT gateway and the service discovery service. Frequent requests may be sent from the IoT gateway to the discovery service, and these requests may be sent by any microservice or independent application inside the IoT gateway. For frequently-used services, the resource consumption and latency can be considerable. Moreover, the developers of micro services or applications must be familiar with the Application Programming Interface (API) of the specific service discovery solution.

As such, the inventors hereof have recognized a number of drawbacks in traditional service discovery processes, including: (1) in a highly distributed environment, each application/micro service in a node may need to make several calls over the network to discover details of services it may require. This wastes network bandwidth, time and has negative impact on latency; (2) An application or micro service is tightly coupled to a particular implementations of a Service Discovery solution. If the solution changes, the service discovery part of the client needs to be re-written to adjust to the new API, which reduces the portability of an application; and (3) developers of the applications or micro services have to learn the API of the service discovery solution they adopted. For some programming languages, such as C and C++, they need more effort to be implemented to invoke the modern API, such as REST with JSON, which is the only to communicate with some service discovery solutions.

SUMMARY

Embodiments of systems and methods for a local proxy for service discovery are described. In an illustrative, non-limiting embodiment, an Internet-of-Things (IoT) gateway may include: a processor; and a memory coupled to the processor, the memory including program instructions stored thereon that, upon execution by the processor, cause the IoT gateway to: retrieve, by a service discovery agent, endpoint information maintained by a service discovery server remotely located with respect to the IoT gateway; store the service endpoint information in the memory; receive a service request aimed at a service endpoint; and provide the service endpoint information, from the memory, in response to the service request.

In some implementations, endpoint information may include at least one of: a Uniform Resource Locator (URL), a host name, or a port number. The service request may be issued by a microservice or an application. The endpoint information may stored as at least one of: a property file, an Operating System variable, or a database.

In some embodiments, the program instructions, upon execution, may cause the IoT gateway to receive endpoint information via a callback Uniform Resource Locator (URL). The service discovery agent may operate based upon a configuration file that includes the service discovery server. The configuration file includes at least one connector that identifies a service discovery server type and at least one writer that identifies a storage type.

Additionally or alternatively, the program instructions, upon execution, may cause the IoT gateway to: retrieve, by the service discovery agent, other endpoint information maintained by another service discovery server distinct from the service discovery server; store the other service endpoint information in the memory; receive another service request aimed at another service endpoint; and provide other service endpoint information, from the memory, in response to the service request.

In some cases, each of the service discovery servers may execute a different service discovery service having a different Application Programming Interface (API). The service endpoint information includes a first Uniform Resource Locator (URL) of an Operating System (OS) variable and a second URL of a database, and the program instructions, upon execution, may cause the IoT gateway to: provide the first URL to a first microservice or application in response to the service endpoint request as part of a load balancing operation; and provide the second URL to a second microservice or application in response to the other service endpoint request as part of the load balancing operation.

For example, the first microservice may be associated with a first type of IoT device in communication with the IoT gateway. The second microservice may be associated with a second type of IoT device in communication with the IoT gateway.

In another illustrative, non-limiting embodiment, a method may implement one or more of the aforementioned operations. In yet another illustrative, non-limiting embodiment, a hardware memory device may have program instructions stored thereon that, upon execution by an IHS, cause the IHS to perform one or more of the aforementioned operations.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
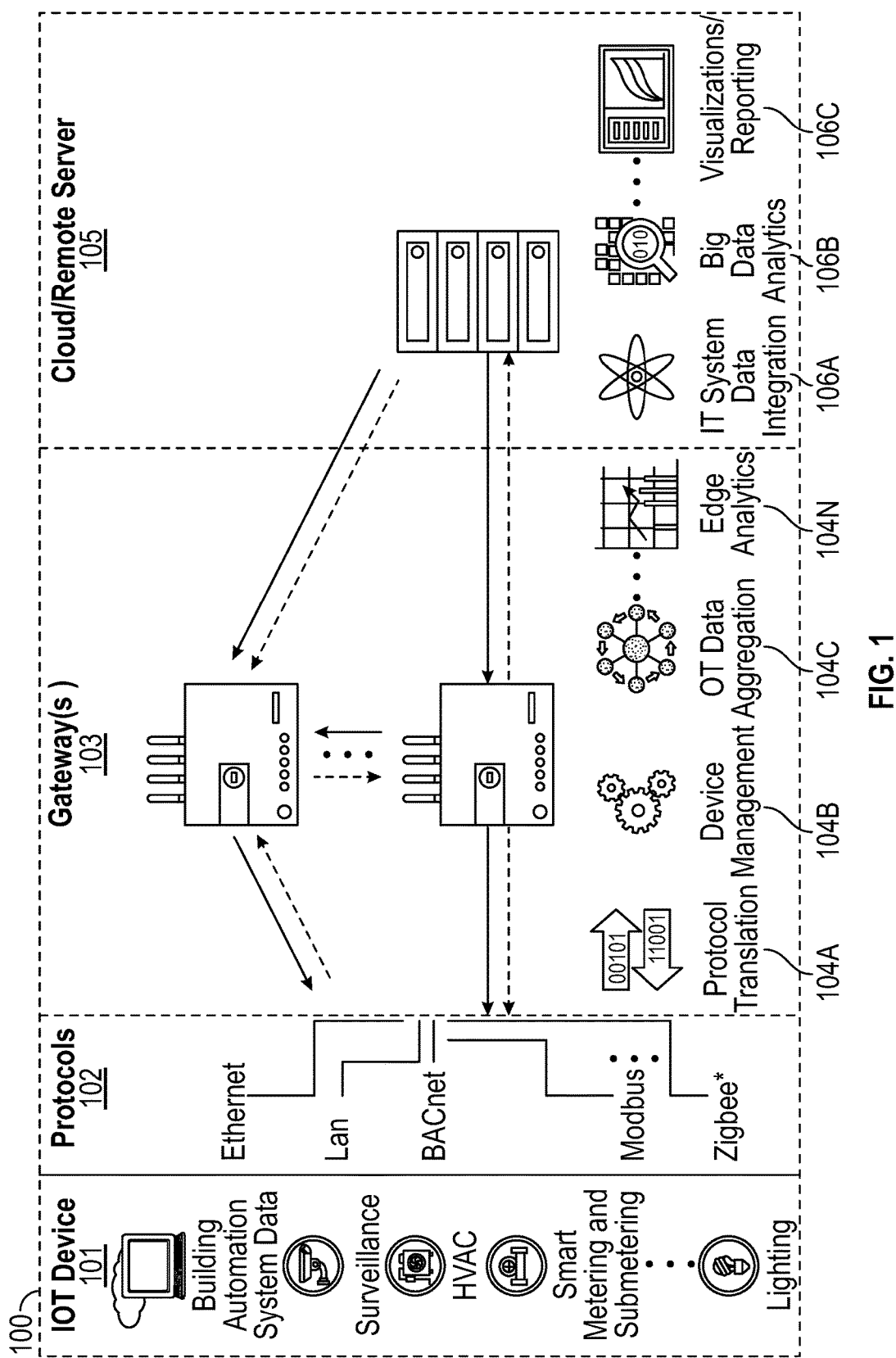
FIG. 1 illustrates an example of an Internet-of-Things (IoT) deployment according to some embodiments.

The Internet-of-Things (IoT) is an inter-networking of "things" or "objects" (generally referred to as "IoT devices") that promotes the collection and exchange of data among those objects. Generally speaking, IoT technology allows IoT devices to operate remotely across a network infrastructure to integrate the physical world into computer-based systems using a variety of different communication protocols. In the near future, it is expected that IoT will be used to automate nearly every field of human endeavor.

To name but a few examples, in the field of manufacturing, IoT may be used in process automation (chemicals, food, beverage, pharmaceuticals), discrete automation (auto, machine, electronics), and industrial equipment. In the field of transportation and logistics, IoT may be used in air, automotive, marine, or rail transport, fleet and freight management, cold chain logistics, traffic systems, public transit and travel, and usage insurance. In the energy field, IoT may be used in power generation and distribution, smart grids, oil and gas, and renewable energy. In communications, IoT may be used to support various information technology (IT) services, network services, data centers, and communication equipment. With respect to natural resources, IoT may be used in agriculture, metals and minerals mining, water and waste management, forestry, fishing, and livestock, and golf courses. In healthcare, IoT may be used in hospitals, home care, health care plans, medical laboratories, biotechnology, and medical appliances and equipment. And in retail and hospitality, IoT may be used in hotels, vending machines, amusement parks, restaurants, sports and entertainment, etc.

In several implementations, IoT systems may provide or support services ranging among: predictive maintenance, process or quality control, fleet management, supply chain and inventory management, smart infrastructure, building optimization, remote asset management, secure and access control, point-of-sale support, energy management, compliance, safety, and documentation, among many others.

Yet the quintessential example of IoT remains home automation. Modern home automation deployments (also known as "smart" or "intelligent" homes) can include control and automation of lighting, heating, ventilation, air conditioning (HVAC) systems, and appliances such as washer/dryers, robotic vacuums, air purifiers, ovens or refrigerators/freezers that use wired or wireless networking for remote monitoring and control.

The expansion of IoT into a plethora of new application areas is expected to generate incredibly large amounts of data from diverse, heterogeneous devices and locations. Nonetheless, there are currently no central standards in this field. Consequently, IoT consumers and providers continue to face many deployment, architecture, analytics, and security challenges.

As noted previously, a service discovery server can reduce the burden on checking an endpoints' availability in widely distributed network, including IoT networks. However, in a conventional service discovery architecture, when different microservices or applications want to query the same endpoint, there are multiple queries from the same IoT Gateway to the service discovery server, which cause bandwidth overhead.

Accordingly, in various embodiments, systems and methods described herein may provide a service discovery agent within the IoT Gateway that is configured to consolidate all the services and applications' queries, and to maintain and refresh results. Such local service discovery agent may handle and maintain data retrieved from the service discovery server in local storage.

To illustrate an example of an IoT environment where the systems and methods described herein may be implemented, FIG. 1 shows IoT deployment 100 according to some embodiments. Particularly, deployment 100 includes IoT device(s) 101, such as building automation and data devices, surveillance devices, HVAC devices, smart metering and sub-metering, lighting devices, etc., which provide and receive data of a network using one or more communication protocols 102, such as Ethernet, BACnet (Building Automation and Control), Controller Area Network (CAN bus), Modbus, Zigbee, Bluetooth, Wi-Fi, RFID, etc.

Using protocol(s) 102, IoT devices 101 communicate with IoT gateway(s) 103. In several implementations, IoT gateway(s) 103 may include services such as protocol translation 104A, device management 104B, data aggregation 104C, and edge analytics 104N. In many cases, elements 101-103 may be disposed or employed in the same premises (e.g., a building, a home, a vehicle, etc.) and/or may be owned by (or licensed to) the same entity or consumer.

In many implementations, however, gateway(s) 103 may also be in communication with cloud or remote server(s) 105, which can then provide services such as IT system data integration 106A, big data analytics 106B, and visualization and reporting 106N. For example, cloud or remote server(s) may be provided or operated by a third-party remotely located with respect to the premises where the IoT device(s) 101 and gateway(s) 103 are deployed.

In some cases, remote server(s) 105 may include a service discovery server or the like (e.g., Apache ZooKeeper™, HashiCorp's Consul, Netflix Open Source Platform's Eureka, Airbnb's SmartStack, etc.). The service discovery server 105 may offer endpoint information (URL), service type, service ID, etc., for example, for one or more of endpoints 101. Once a client needs such an endpoint's service, it queries service discovery server 105 and retrieves the service endpoint information.

Here it should be emphasized that IoT deployment 100 is depicted for sake of illustration only. There are virtually infinite different configurations possible in any given IoT deployment. In fact, it is often desirable that a given IoT installation remain flexible, so that new and different IoT devices, gateways, switches, access points, servers, services, etc. may be added, removed, or replaced, as the IoT network evolves over time. Although the techniques discussed herein are immediately applicable to the example IoT deployment 100 of FIG. 1, it is understood that the same techniques may be equally application to any IoT environment.

In some embodiments, one or more of gateway(s) 103, server(s) 105, and/or IoT devices 101 shown in FIG. 1 may be implemented as an Information Handling System (IHS).

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, touchscreen and/or a video display. The IHS may also include one or more buses operable to transmit communications between the various hardware components.

For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of NVMs.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 2:
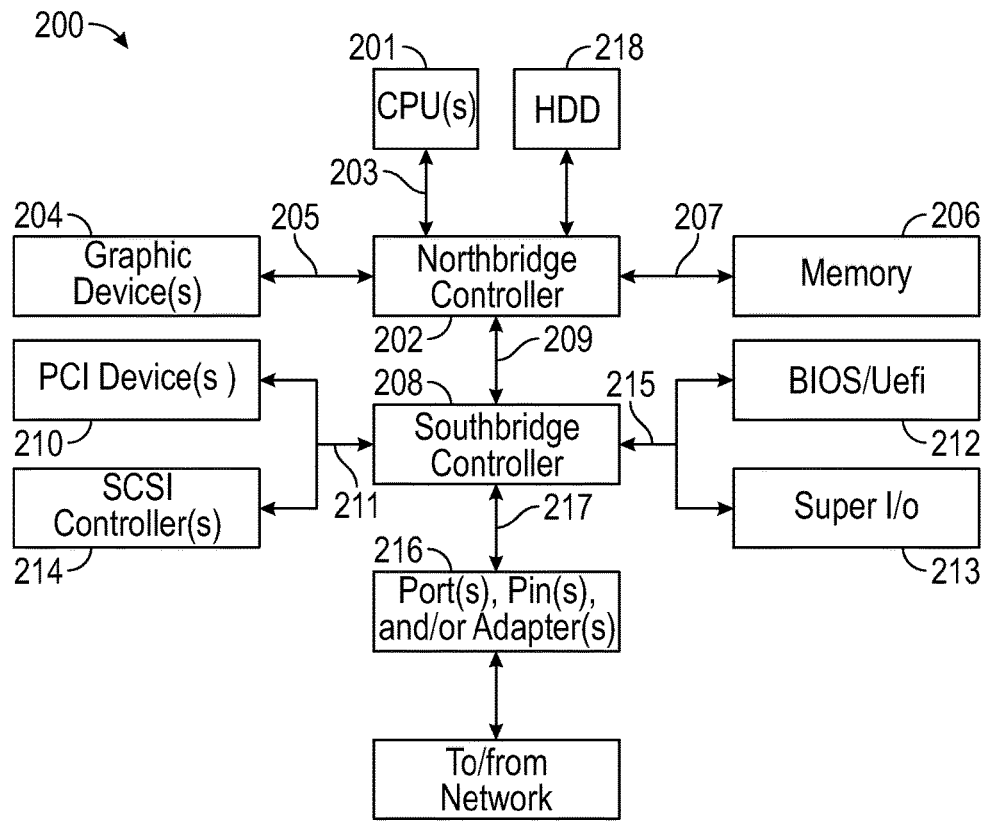
FIG. 2 illustrates an example of an Information Handling System (IHS) implementation according to some embodiments.

FIG. 2 is a block diagram of an example of an IHS. Although IHS 200 may be used to build any component shown in FIG. 1, it is particularly applicable to implementations of IoT gateway(s) 103. In some situations, an IoT gateway can have additional compute added if edge analytics are needed on the gateway at the network edge, as opposed to being distributed in the cloud/backend server.

As shown, IHS 200 includes one or more CPUs 201. In various embodiments, IHS 200 may be a single-processor system including one CPU 201, or a multi-processor system including two or more CPU(s) 201 (e.g., two, four, eight, or any other suitable number). CPU(s) 201 may include any processor capable of executing program instructions. For example, in various embodiments, CPU(s) 201 may be general-purpose or embedded processors implementing any of a variety of Instruction Set Architectures (ISAs), such as the x86, POWERPC®, ARM®, SPARC®, or MIPS® ISAs, or any other suitable ISA. In multi-processor systems, each of CPU(s) 201 may commonly, but not necessarily, implement the same ISA.

In some cases, one or more of CPU(s) 201 may include a Graphics Processing Unit (GPU), field programmable gate array (FPGA), or other suitable integrated component that is specifically used to perform analytics (e.g., machine learning).

CPU(s) 201 are coupled to northbridge controller or chipset 202 via front-side bus 203. Northbridge controller 202 may be configured to coordinate I/O traffic between CPU(s) 201 and other components. For example, in this particular implementation, northbridge controller 202 is coupled to graphics device(s) 204 (e.g., one or more video cards or adaptors) via graphics bus 205 (e.g., an Accelerated Graphics Port or AGP bus, a Peripheral Component Interconnect or PCI bus, or the like).

Northbridge controller 202 is also coupled to system memory 206 via memory bus 207, and to hard disk drive (HDD) 218. Memory 206 may be configured to store program instructions and/or data accessible by CPU(s) 201. In various embodiments, memory 206 may be implemented using any suitable memory technology, such as static RAM (SRAM), synchronous dynamic RAM (SDRAM), nonvolatile/Flash-type memory, or any other type of memory. Conversely, HDD 218 may include any magnetic, solid-state (SSD), or hybrid data storage device capable of storing an OS and other applications.

In operation, CPU(s) 201 execute program instructions that are stored in memory 206 and/or HDD 218. Under control of those instructions, IHS 200 may be configured to provide a number or services described in more detail below.

Northbridge controller 202 is coupled to southbridge controller or chipset 208 via internal bus 209. Generally speaking, southbridge controller 208 may be configured to handle various of IHS 200's I/O operations, and it may provide interfaces such as, for instance, Universal Serial Bus (USB), audio, serial (e.g., RS232, RS485, CANbus, RS422, etc.), parallel, Ethernet, or the like via port(s), pin(s) (e.g., GPIO or General-Purpose Input Output), and/or adapter(s) 216 over bus 217.

For example, southbridge controller 208 may be configured to allow data to be exchanged between IHS 200 and other devices, such as other IHSs attached to a network (e.g., network 101). In various embodiments, southbridge controller 208 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol.

Southbridge controller 208 may also enable connection to one or more keyboards, keypads, touch screens, scanning devices, voice or optical recognition devices, or any other devices suitable for entering or retrieving data. Multiple I/O devices may be present in IHS 200. In some embodiments, I/O devices may be separate from IHS 200 and may interact with IHS 200 through a wired or wireless connection. As shown, southbridge controller 208 is further coupled to one or more PCI devices 210 (e.g., modems, network cards, sound cards, or video cards) and to one or more SCSI controllers 214 via parallel bus 211.

Southbridge controller 208 is also coupled to BIOS/UEFI 212 and to Super I/O Controller 213 via Low Pin Count (LPC) bus 215. BIOS/UEFI 212 includes non-volatile memory having program instructions stored thereon. Those instructions may be usable by CPU(s) 201 to initialize and test other hardware components and/or to load an Operating System (OS) onto IHS 200. Super I/O Controller 213 combines interfaces for a variety of lower bandwidth or low data rate devices. Those devices may include, for example, floppy disks, parallel ports, keyboard and mouse, temperature sensor and fan speed monitoring/control, among others. In various implementations, southbridge controller 208 may be configured to allow data to be exchanged between BIOS/UEFI 212 and another IHS attached to a network (e.g., a remote server or other source of technical service) using wired or wireless capabilities of network adapter 216.

In some cases, IHS 200 may be configured to provide access to different types of computer-accessible media separate from memory 206. Generally speaking, a computer-accessible medium may include any tangible, non-transitory storage media or memory media such as electronic, magnetic, or optical media—e.g., magnetic disk, a hard drive, a CD/DVD-ROM, a Flash memory, etc. coupled to IHS 200 via northbridge controller 202 and/or southbridge controller 208.

The terms "physical," "hardware," "tangible," and "non-transitory," when used in the context of computer-readable storage or memories, are intended to describe devices excluding propagating electromagnetic signals; but are not intended to otherwise limit the type of physical storage device. For instance, the aforementioned terms are intended to encompass types of hardware, physical storage devices that do not necessarily store information permanently, including, for example, RAM. Program instructions and data stored on a physical memory device in non-transitory form may afterwards be transmitted by transmission media or signals such as electrical, electromagnetic, or digital signals, as a separate or independent process, which may then be conveyed via a communication medium such as a network and/or a wireless link.

A person of ordinary skill in the art will appreciate that IHS 200 is merely illustrative and is not intended to limit the scope of the disclosure described herein. In particular, any computer system and/or device may include any combination of hardware or software capable of performing certain operations described herein. In addition, the operations performed by the illustrated components may, in some embodiments, be performed by fewer components or distributed across additional components. Similarly, in other embodiments, the operations of some of the illustrated components may not be performed and/or other additional operations may be available.

For example, in some implementations, northbridge controller 202 may be combined with southbridge controller 208, and/or be at least partially incorporated into CPU(s) 201. In other implementations, one or more of the devices or components shown in FIG. 2 may be absent, or one or more other components may be present. For instance, in some cases, IHS 200 may include a Trusted Platform Module (TPM) or secure cryptoprocessor, not shown in FIG. 2 for sake of simplicity. But it should be readily understood that the systems and methods described herein may be implemented or executed with other IHS configurations.

In various embodiments, IHS 200 may be contained within a chassis, case, or other enclosure. And, in many applications, such a chassis may have an industrial or rugged design that can be fan-less, operate within a temperature range (e.g., −10° C.-70° C.), support multiple power supplies and/or wireless antennas, etc.

Figure 3:
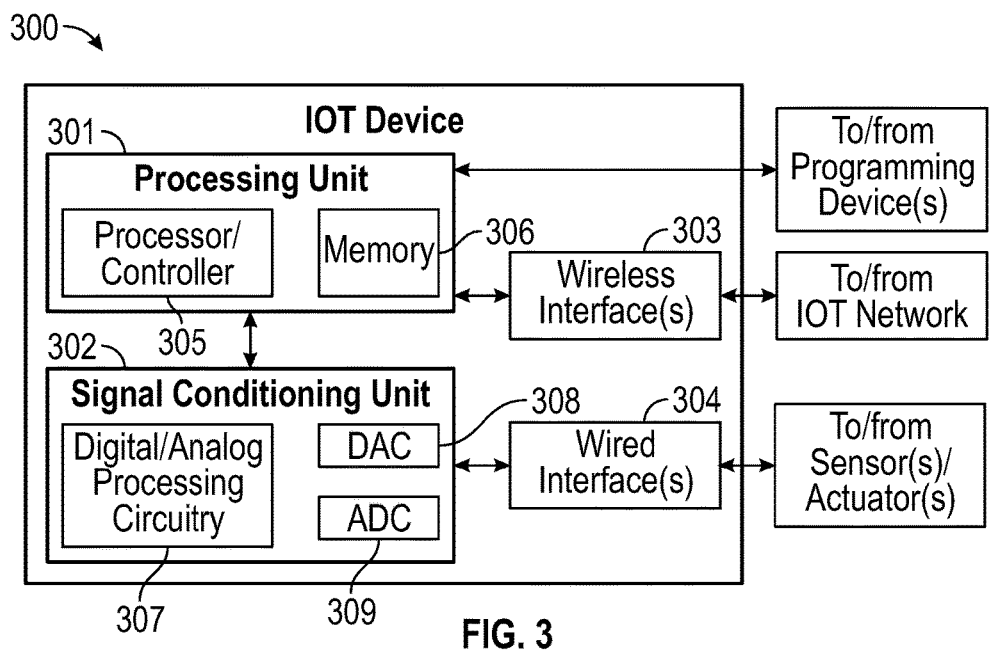
FIG. 3 illustrates an example of an IoT device implementation according to some embodiments.

Referring now to FIG. 3, any given one of IoT devices 101 of FIG. 1 may be implemented as device 300. It should be noted, however, that IoT device architectures typically vary widely from device to device. Generally speaking, IoT devices range from legacy sensors and actuators (e.g., interfaced via adaptors, hubs, or other circuitry that provides network connectivity) to sophisticated embedded devices and IHSs, such as IHS 200 of FIG. 2.

Therefore, although device 300 is likely to be found in a modern IoT environment, it should also be kept in mind that the various components of device 300 are discussed for sake of illustration only. It should be readily understood, however, that certain systems and methods described herein may be implemented or executed with other IoT device configurations.

Referring back to FIG. 3, IoT device 300 includes processing unit 301, signal conditioning unit 302, wireless interface 303, and wired interface 304. Processing unit 301 includes processor or controller 305 and memory 306. Signal conditioning unit 302 includes digital/analog processing circuitry 307, digital-to-analog converter (DAC) 308, and analog-to-digital converter (ADC) 309.

Wireless interface 303 may include any hardware, circuitry, and/or software that enables IoT device 300 to receive and/or transmit data over a wireless medium.

Examples of wireless networks include, but are not limited to, Wi-Fi, Bluetooth, BLE, ZigBee, Z-wave, 6LoWPAN, Thread, Sigfox, LoRA, WirelessHD, WiGig, HaLow, NFC, RFID, SigFox LoRaWAN, Ingenu, Weightless, ANT, DigiMesh, MiWi EnOcean, Dash7, or WirelessHART networks, cellular networks (e.g., second generation (2G), third generation (3G), fourth generation (4G), a Long Term Evolution (LTE), a fifth generation (5G) network), and satellite networks. Typically, wireless interface(s) 303 are used to communicate data between IoT devices, IoT gateways, backend servers, etc. ("to/from IoT network").

Wired interface 304 may include any hardware, circuitry, and/or software that enables IoT device 300 to receive and/or transmit data over a wired medium. Examples of wired networks include Ethernet, cable, optical fiber, USB, HDMI, DSL, PowerLine, HomePlug, HomePNA, X10, and Public Switched Telephone Networks (PSTN). Similarly as above, wired interface(s) 304 may also be used to communicate data over an IoT network.

Additionally or alternatively, wired interface 304 may include circuitry configured to receive and transmit digital signals or data such as, for example, RS232, RS485, CANbus, RS422, USB, video signals (e.g., to and from a monitor or camera), and GPIO. Additionally or alternatively, wired interface 304 may be used to transmit and receive analog signals usable to indicate and/or to control the status of buttons, switches, contactors, actuators, etc. ("to/from sensor(s)/actuator(s)").

Processor or controller 305 and memory 306 operate similarly as CPU(s) 201 and memories 206 and 218 of IHS 200. That is, processor 305 executes program instructions that are either stored in the processor itself or in memory 306. Under control of those instructions, IoT device 300 may be configured to provide a number or services described in more detail below. In some cases, a programming device may provide such instructions to processor/controller 305 using a dedicated PLC interface or the like ("to/from programming device(s)").

Digital/analog processing circuitry 307 may include any digital or analog circuitry configured condition input or output signals that are received or transmitted by IoT device 300, particularly through wired interface(s) 304. For example, analog signals may be transmitted using DAC circuitry 308 and received using ADC circuitry 309. Accordingly, processing circuitry 307 may include any signal processing circuit (DSP), filter, amplifier, mixer, integrator, limiter, oscillator, impedance, rectifier, etc. In some cases, digital/analog processing circuitry 307 may be integrated into processor/controller 305.

It should be noted that, it many applications, any hardware equipment used to interconnect any component in an IoT network may itself be an IoT device (e.g., a wireless access point, a network switch, a legacy sensor hub or aggregator, etc.). Additionally or alternatively, in many applications, otherwise conventional IHS devices, such as, for example, computers, desktops, smart phones, tablets, etc., may also operate as IoT devices.

Figure 4:
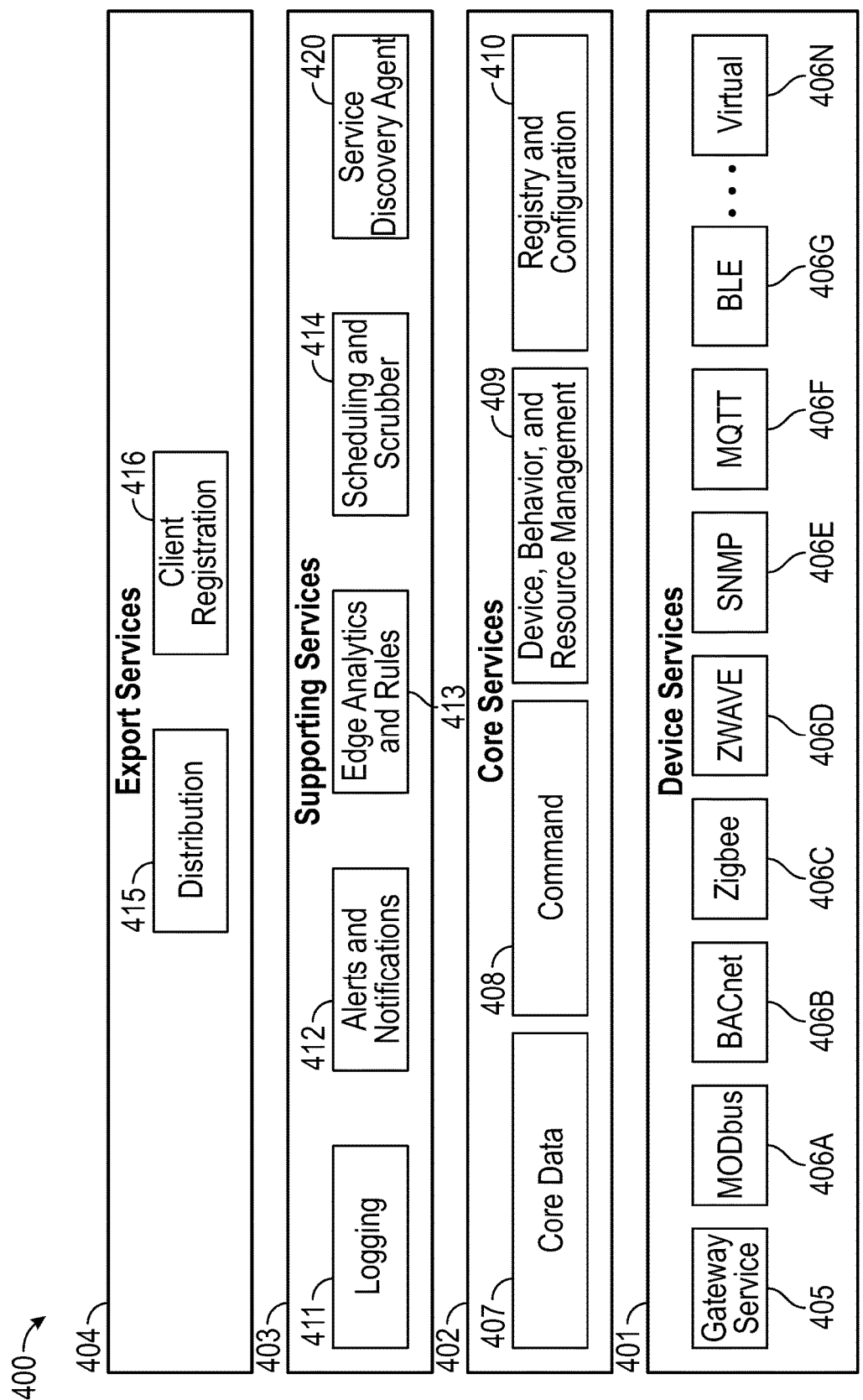
FIG. 4 illustrates examples of IoT services according to some embodiments.

FIG. 4 illustrates examples of IoT services. In various embodiments, services 400 may be provided and/or enabled via execution of program instructions by CPU(s) 201 of IHS 200 (FIG. 2) implementing any given one of IoT gateway(s) 103 (FIG. 1). In this particular implementation, services 400 include device services 401, core services 402, supporting services 403, and export services 404.

Device services 401 enable IoT gateway(s) 103 to transmit and receive data to and from IoT devices 101 and/or other IoT gateway(s) 103 over wireless and/or wired interfaces 303 and 304, respectively. In this embodiment, device services 401 include the following modules or microservices: gateway service 405 (Peer-to-Peer or P2P), Modbus service 406A, BACnet service 406B, ZigBee service 406C, Zwave service 406D, SNMP service 406E, MQTT service 406F, BLE service 406G, and virtual service 406N (for virtual IoT devices). It should be noted, however, that in other embodiments, device services 401 may include other modules or microservices configured to enable IoT gateway(s) 103 to perform operations described herein, including, for example, communicating with any device in the IoT network using a suitable communication protocol.

Core services 402 enable IoT gateway(s) 103 to receive and store data in memory, to issue commands to IoT devices using device services 401, to manage metadata and provisioning of IoT devices, as well as IoT device registration and configuration. In this embodiment, core services 402 include the following modules or microservices: core data service 407; command service 408; device, behavior, and resource management service 409; and registry and configuration service 410. It should be noted, however, that in other embodiments, core services 402 may include other modules or microservices configured to enable IoT gateway(s) 103 to perform operations described herein.

Supporting services 403 enable IoT gateway(s) 103 to log events generate alerts and notification, and to apply rules, as well as scheduling, and scrubbing. In this embodiment, export services 404 include the following modules or microservices: logging 411, alerts and notifications 412, edge analytics and rules 413, scheduling and scrubber 414, and service discovery agent 420. It should be noted, however, that in other embodiments, supporting services 403 may include other modules or microservices configured to enable IoT gateway(s) 103 to perform operations described herein.

Export services 404 enable IoT gateway(s) 103 to distribute data to other IoT gateway(s) 103 and/or server 105, as well as to perform client registration operations. In this embodiment, export services 404 include the following modules or microservices: distribution 415 and client registration 416. It should be noted, however, that in other embodiments, export services 404 may include other modules or microservices configured to enable IoT gateway(s) 103 to perform operations described herein.

In various embodiments, any given one of microservices 405-416 may be provided in the form of program instructions executable by CPU(s) 201. In some cases, all of microservices 405-416 are written in the same programming language. In other cases, however, different microservices may be written in different languages. Examples of suitable programming languages include, but are not limited to: Java, C, Javascript, C++, Python, Node.js, PHP, Lua., Assembler, Go, SWIFT, Rust, Parasail, B#, Ruby, Haskell, erlang, scala, R, etc.

In operation, microservices 405-416 and 420 may communicate with each other any suitable communication protocol. For example, in some cases, inter-service communications may use RESTful interfaces. In other embodiments, however, communications may be supported by other protocols such as ZeroMQ (0MQ), MQTT, AMPQ, SNMP, DDS, or the like.

Figure 5:
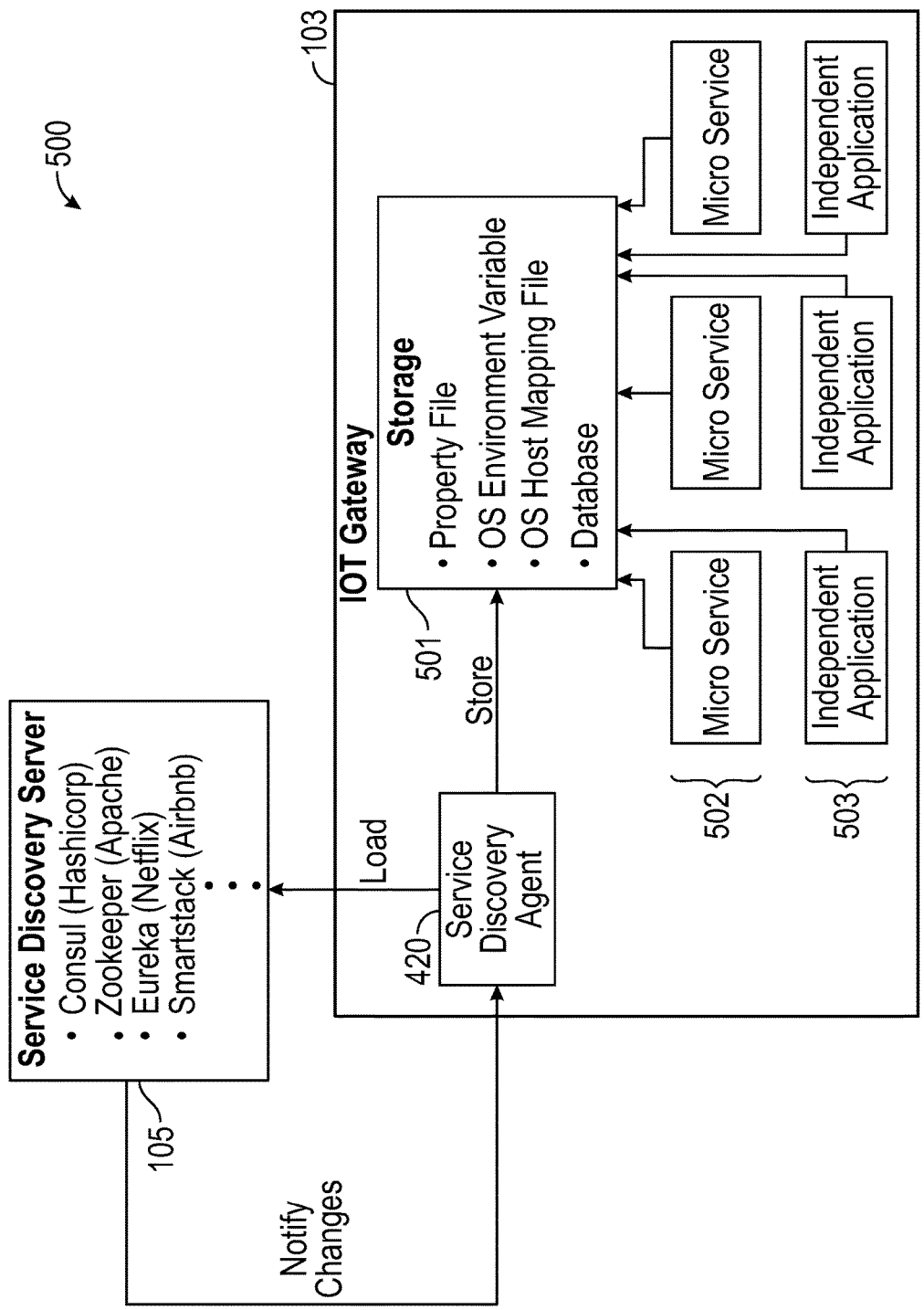
FIG. 5 illustrates an example of a service discovery architecture according to some embodiments.

FIG. 5 illustrates an example of a service discovery architecture 500 according to some embodiments. As shown, IoT gateway 103 includes service discovery agent 420 coupled to service discovery server 105, which remotely located from IoT gateway 103 (e.g., in a cloud or network). In various embodiments, service discovery server 105 may execute a different service discovery services having a different Application Programming Interfaces (APIs).

In operation, service discovery agent 420 receives service endpoint information from service discovery server 105, in response the service requests issued by microservices 502 and/or independent applications 503. Service endpoint information may also be received by service discovery agent 420 based upon endpoint updates sent to service discovery server 105 by those endpoint. Service discovery server 105 may notify service discovery agent 420 of service information changes via a callback Uniform Resource Locator (URL) or the like.

Storage 501 may include a storage schema such as OS environment variables, databases, etc., and saves the data for microservices 502 or applications 503 to use. The database may be implemented, for example, as a lightweight database, including relational databases and NoSQL databases, such as, MySQL, H2, CouchDB, MongoDB, Redis, and so on.

As such, service discovery agent 420 stores the queried service endpoints information into the local storage 501 such as files, OS environment variables, etc. This means micro services 502 and applications 503 do not need to add any code specifically for interfacing with service discovery agent 420. Service discovery agent 420 is decoupled from microservices 502 and applications 503, and the IoT Gateway administrator can remove service discovery agent 420 at any time, or manually change the storage values for testing or debugging without modifying any codes of microservices 502 and applications 503.

Figure 6:
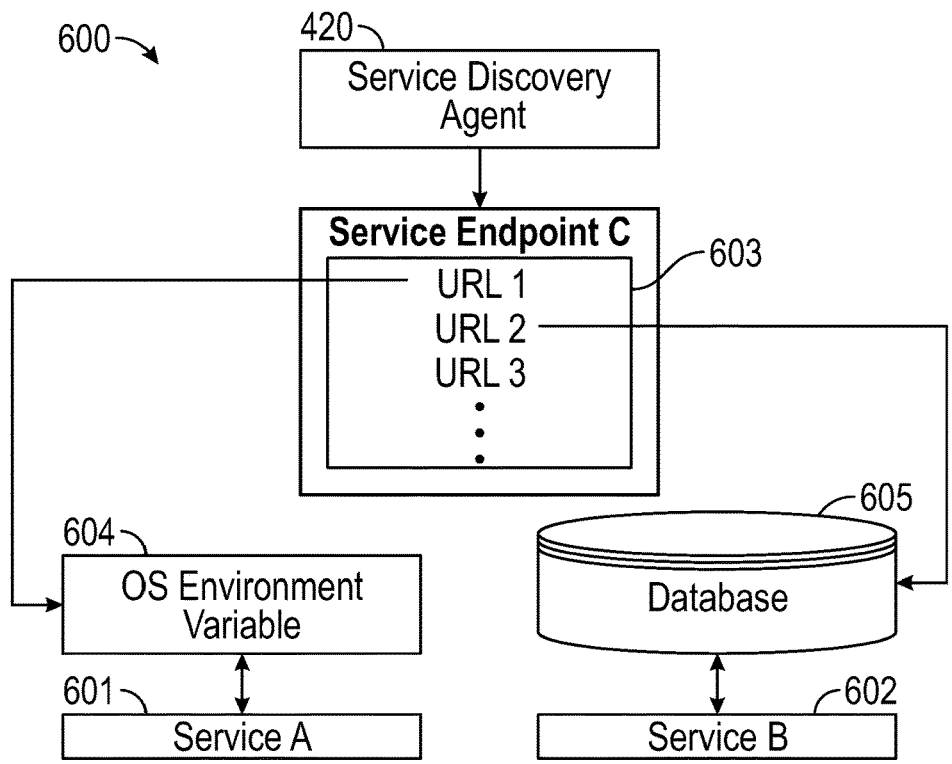
FIG. 6 illustrates an example of a load balancing operation by a service discovery agent according to some embodiments.

FIG. 6 illustrates an example of a load balancing operation by service discovery agent 420 according to some embodiments. In this example, there are 2 services, one is service A 601 which accesses service endpoint C 603 by OS environment variables 604, and another is services B 602, which accesses service endpoint C 603 by database 605.

Both service A 601 and service B 602 invoke the same service endpoint C 603. Service discovery agent can assign different URLs of service endpoint C 603 into OS environment variable 604 and database 605 separately so that Service A 601 and Service B 602 can query the same endpoint through different URLs to achieve load balance with a round-robin mechanism or the like—which usually results in a fairly even distribution of queries across the different URLs for the same endpoint 603.

Figure 7:
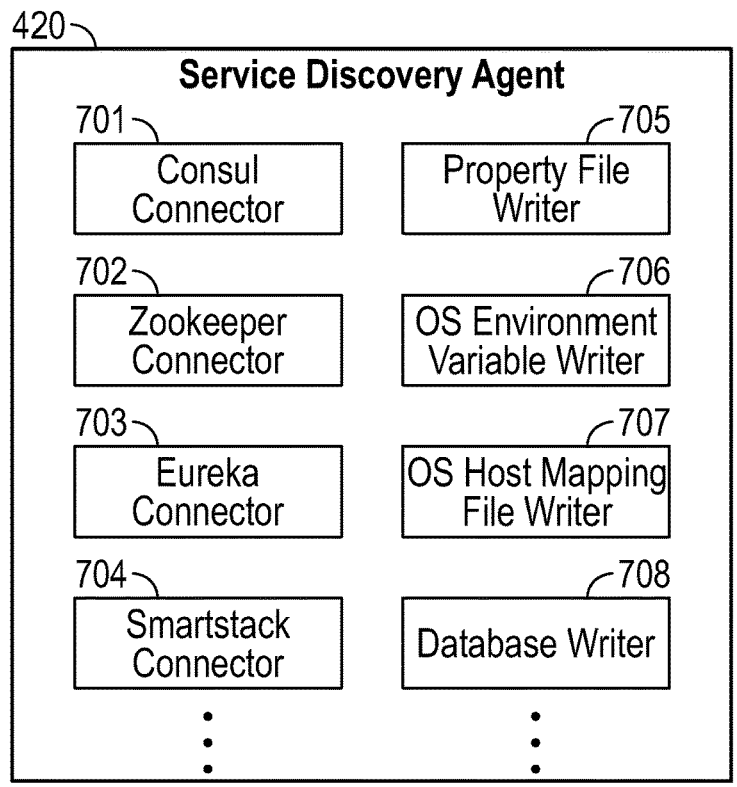
FIG. 7 illustrates an example of components of a service discovery agent according to some embodiments.

FIG. 7 illustrates an example of components of service discovery agent 420. In some embodiments, service discovery agent 420 has two types of components, connectors and writers. For example, connector components can include Consul connector 701, Zookeeper connector 702, Eureka connector 703, SmartStack connector 704, etc. Meanwhile, writer components can include property file write 705, OS environment variable writer 706, OS Host Mapping File writer 707, database writer 708, etc.

Service discovery agent 420 may be extended flexibly once the user wants to add different types of connectors or writers, such that service discovery agent 420 can be upgraded independently without impacting the whole IoT gateway. With those connectors to take care of the service discovery APIs, developers of microservices and applications can focus on the business logic without spending time on investigating these various APIs, and the endpoint information can be retrieved via other channels, such as via OS environment variables, property files, and so on.

Figure 8:
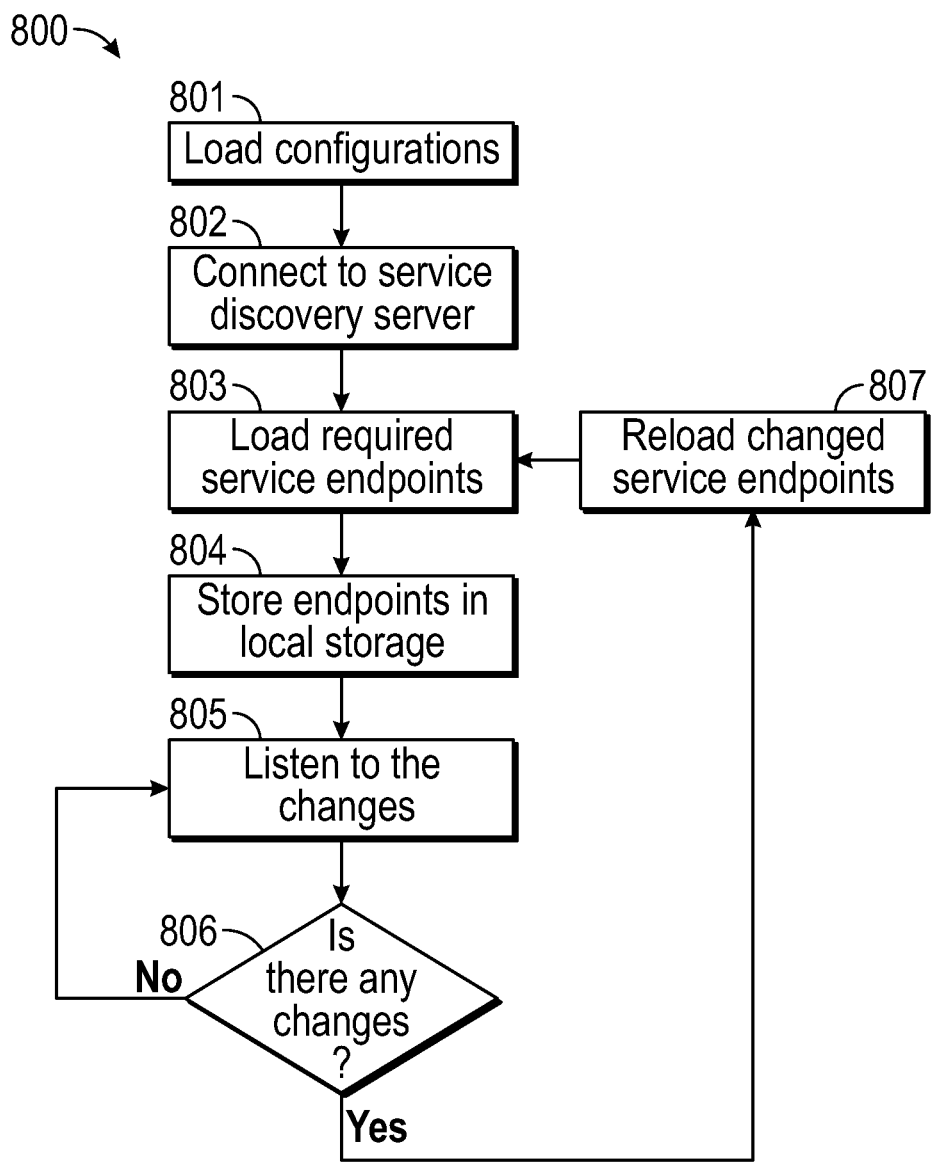
FIG. 8 illustrates an example of a service discovery method according to some embodiments.

FIG. 8 illustrates an example of service discovery method 800. In some embodiments, method 800 may be performed by service discovery agent 420 of IoT gateway 130. At block 803, service discovery agent 420 loads all the service endpoints information from server discovery server 105, based on predefined configurations loaded at block 801, and after connecting to the server 105 at block 802.

At block 804, service discovery agent 420 may save the endpoint information into the local storages such as property files, OS environment variables and database, etc. All the microservices and applications will retrieve the service endpoints information from the supported storages. And when there is any change occurring in the service discovery server 105, as detected in blocks 805 and 806, service discovery agent 420 may be notified by callback URLs, message queue, or any mechanism provided by service discovery server 105 to update the corresponding values in the local storages at block 807. Consequently, the local storages can always retain the latest values.

Figure 9:
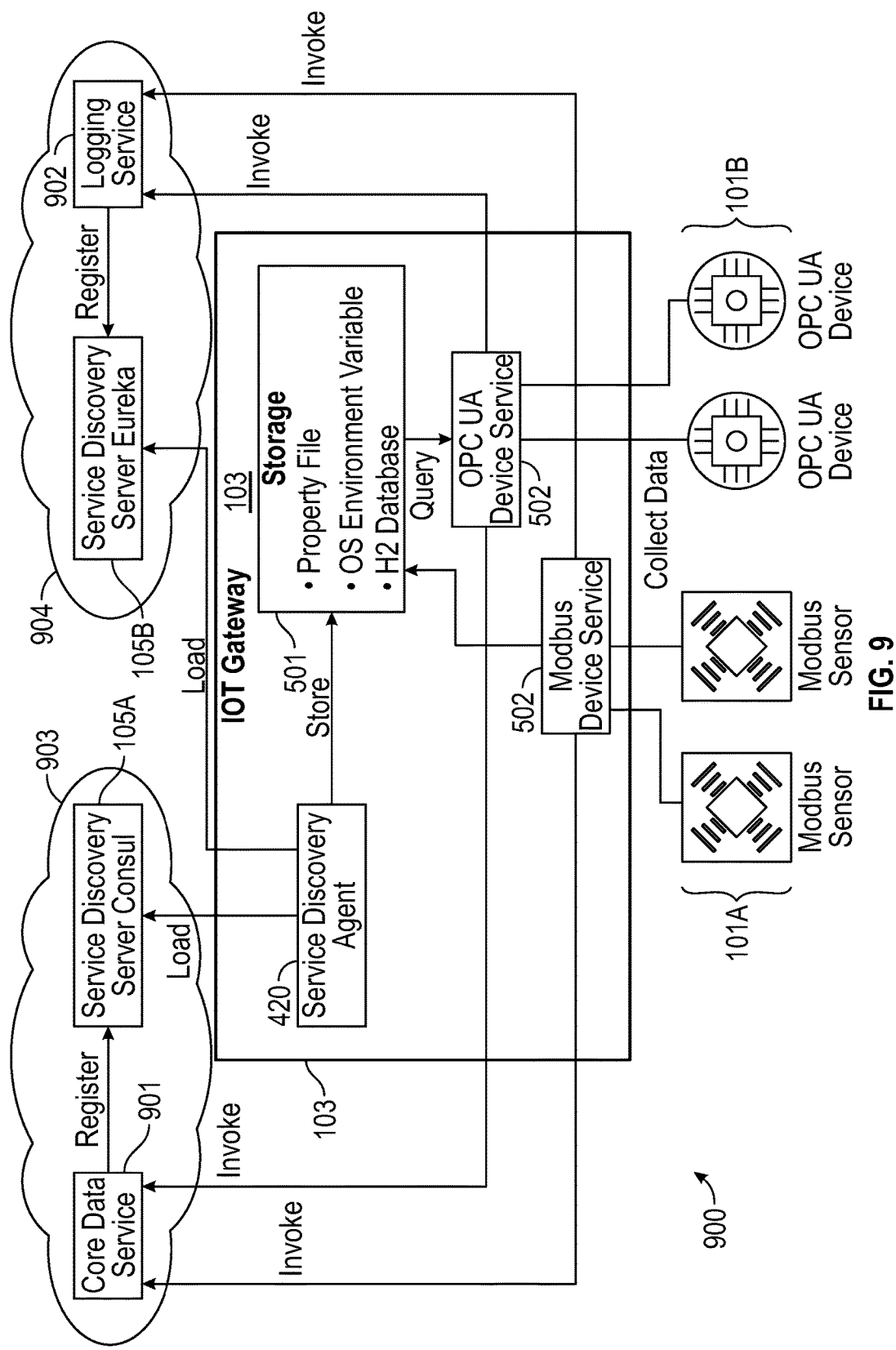
FIG. 9 illustrates an example of a service discovery implementation according to some embodiments.

FIG. 9 illustrates an example of service discovery implementation 900. In this non-limiting example, IoT Gateway 103 collects data from some Modbus sensors 101A and OPC UA devices 101B, and it has to communicate with two external services—Core Data Service 901 and Logging Service 902—which are on two different private clouds 903 and 904 for persisting data and logs.

Core Data Service 901 is responsible for persisting the data collecting from sensors and devices 101, and Logging Service 902 is responsible for persisting and managing application logs for analysis or debug. The endpoint information of these two external services, such as host name and port number, is dynamic due to high availability consideration, which means the client services need to retrieve the endpoint information from service discovery servers.

The two private clouds 903 and 904 may adopt different kinds of service discovery servers 105A and 105B, Consul and Eureka, respectively. Since Consul and Eureka have different API and message formats, the service implementation 502 in the IoT Gateway 103 needs to deal with both of them. However, with service discovery agent 420, the service implementation 502 in IoT gateway 103 can focus on its business logic.

In this example, a configuration file of service discovery agent 420 may be defined (in YAML format) to specify which service discovery servers are connecting and what kinds of storage types should be provided to internal service or applications:

discovery:
  connectors:
    server-type: consul
      host: 192.168.11.15
      port: 8500
    server-type: eureka
      host: 192.168.11.25
      port: 8761
  writers:
    storage-type: environment-variable
    storage-type: property-file
      path: /etc/enpoints.properties
    storage-type: H2DB
      URL: 192.168.11.25
      username: admin
      password: password Device services 502 in IoT gateway 103 need to pass collected data to Core Data Service 901 and application log to Logging Service 902. To retrieve the endpoint information, the developers of the device services 502 many choose any one of the available storage types.

In summary, systems and methods described herein provide a local service discovery agent that works as a proxy for all N service discovery servers distributed over the network. The local agent eliminates the need for each client to individually make service discovery calls over network. If there are N services, and each one needs to make N queries to service discovery servers, then there would be $O(N^2)$ network communications. Whereas, with a local proxy it reduces it to $O(N)$ network communications (it cuts the network traffic by 1/N). Service doesn't need to query the discovery server for each call, so it saves the network bandwidth and improve performance.

Additionally or alternatively, systems and methods described herein may reduce service discovery calls from a network access problem to a local storage access problem, thus increasing the time efficiency. Additionally or alternatively, systems and methods described herein may decouple service discovery protocols from the client. Regardless of how services are being advertised (e.g., Zookeeper, Consul, etc.), a client can continue using the same set of APIs to access them from local storage (e.g., database/environment variables etc.). This increases the portability of an application. Additionally or alternatively, any changes to the service discovery solution may be isolated only to the local service discovery agent. The rest of the components of a node may be left untouched, making the system more scalable. Additionally or alternatively, systems and methods described herein may implement load balancing.

Service discovery information may be saved in local storage in several common ways, such as property file or environment variable, which makes services independent. It decouples the relationship between service and the service discovery server by eliminating the dependency of service discovery protocols in the individual services, and requiring the local proxy to be the only agent that needs to be aware of any particular service discovery protocol.

A local proxy may support plug-ins for all supported service discovery server APIs. For example, conventionally, when a user chooses a first service discovery solution and encounter a service limitation later on, they have to modify their source code to switch to another service discovery solution, because the two APIs are different. Using systems and methods described herein, however, only appropriate plug-in support would be needed for the local proxy agent, and the individual services would not have to be modified to support the new API/service discovery protocols. Moreover, there is no hard dependency between services and service discovery agent: once a service discovery agent crashes, services could continue to work with the local storage.

Information from multiple different service discovery solutions may be aggregated. In a large distributed system, especially in the IoT area, there may be more than one systems running with different service discovery solutions. In addition, the duplicated information may be handled properly by a service discovery agent. Thus, services may access the completed endpoint information from local storage.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Internet-of-Things (IoT) gateway, comprising:
a processor; and
a memory coupled to the processor, the memory including program instructions stored thereon that, upon execution by the processor, cause the IoT gateway to:
retrieve, by a service discovery agent, endpoint information maintained by a service discovery server remotely located with respect to the IoT gateway, wherein the service discovery agent operates based upon a configuration file that includes at least one connector that identifies a service discovery server type and at least one writer that identifies a storage type;
store the service endpoint information in the memory;
receive a service request aimed at a service endpoint, wherein the service request is issued by a microservice or an application executed by the IoT gateway; and
provide the service endpoint information, from the memory, in response to the service request.

2. The IoT gateway of claim 1, wherein the endpoint information includes at least one of: a Uniform Resource Locator (URL), a host name, or a port number.

3. The IoT gateway of claim 1, wherein the endpoint information is stored as at least one of: a property file, an Operating System variable, or a database.

4. The IoT gateway of claim 1, wherein the program instructions, upon execution, cause the IoT gateway to receive endpoint information via a callback Uniform Resource Locator (URL).

5. The IoT gateway of claim 1, wherein the program instructions, upon execution, cause the IoT gateway to:
retrieve, by the service discovery agent, other endpoint information maintained by another service discovery server distinct from the service discovery server;

store the other service endpoint information in the memory;

receive another service request aimed at another service endpoint; and provide other service endpoint information, from the memory, in response to the service request.

6. The IoT gateway of claim 5, wherein each of the service discovery servers executes a different service discovery service having a different Application Programming Interface (API).

7. The IoT gateway of claim 6, wherein the service endpoint information includes a first Uniform Resource Locator (URL) of an Operating System (OS) variable and a second URL of a database, and wherein the program instructions, upon execution, further cause the IoT gateway to:

provide the first URL to a first microservice or application in response to the service endpoint request as part of a load balancing operation; and provide the second URL to a second microservice or application in response to the other service endpoint request as part of the load balancing operation.

8. The IoT gateway of claim 7, wherein the first microservice is associated with a first type of IoT device in communication with the IoT gateway, and wherein the second microservice is associated with a second type of IoT device in communication with the IoT gateway.

9. A hardware memory device having program instructions stored thereon that, upon execution by an Information Handling System (IHS), cause the IHS to:

retrieve, by a service discovery agent, first endpoint information maintained by a service discovery server remotely located with respect to an Internet-of-Things (IoT) gateway, wherein the discovery agent operates based upon a configuration file that includes at least one connector that identifies a service discovery server type and at least one writer that identifies a storage type;

store the service endpoint information in the memory;

receive a service request aimed at a service endpoint, wherein the service request is issued by a microservice or an application executed by the IoT gateway;

provide the service endpoint information, from the memory, in response to the service request;

retrieve, by the service discovery agent, other endpoint information maintained by another service discovery server distinct from the service discovery server;

store the other service endpoint information in the memory;

receive another service request aimed at another service endpoint; and provide the other service endpoint information, from the memory, in response to the service request.

10. The hardware memory device of claim 9, wherein each of the service discovery servers executes a different service discovery service having a different Application Programming Interface (API).

11. A method, comprising:

retrieving, by a service discovery agent executed by an Internet-of-Things (IoT) gateway, endpoint information maintained by a service discovery server remotely located with respect to the IoT gateway, wherein the service discovery agent operates based upon a configuration file that includes at least one connector that identifies a service discovery server type and at least one writer that identifies a storage type;

storing the service endpoint information in a memory local to the IoT gateway;

receiving a service request aimed at a service endpoint, wherein the service request is issued by a microservice or an application executed by the IoT gateway; and providing the service endpoint information, from the memory, in response to the service request.

12. The method of claim 11, further comprising:

retrieving, by the service discovery agent, other endpoint information maintained by another service discovery server distinct from the service discovery server;

storing the other service endpoint information in the memory;

receiving another service request aimed at another service endpoint; and providing other service endpoint information, from the memory, in response to the service request.

13. The method of claim 12, wherein each of the service discovery servers executes a different service discovery service having a different Application Programming Interface (API).

14. The method of claim 13, wherein the service endpoint information includes a first Uniform Resource Locator (URL) of an Operating System (OS) variable and a second URL of a database, the method further comprising:

providing the first URL to a first microservice or application in response to the service endpoint request as part of a load balancing operation; and providing the second URL to a second microservice or application in response to the other service endpoint request as part of the load balancing operation.

* * * * *